R. HUBER.
SHOCK ABSORBER.
APPLICATION FILED JAN. 24, 1908.

908,993.

Patented Jan. 5, 1909.

2 SHEETS—SHEET 1.

Witnesses
F. L. Ourand
J. P. Campbell

Inventor
Raymond Huber
By Louis Bagger & Co
his Attorneys

R. HUBER.
SHOCK ABSORBER.
APPLICATION FILED JAN. 24, 1908.
908,993.
Patented Jan. 5, 1909.
2 SHEETS—SHEET 2.
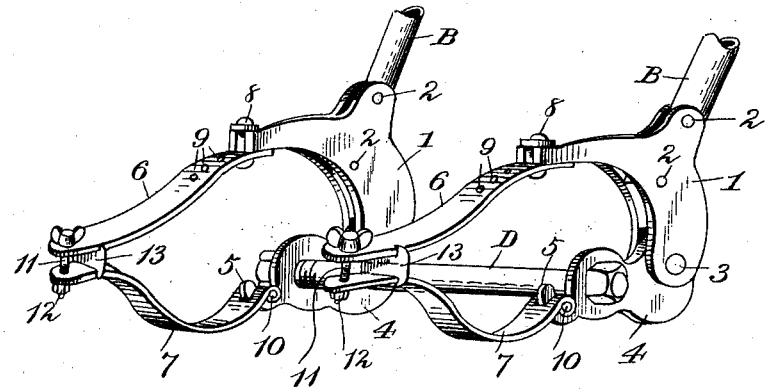
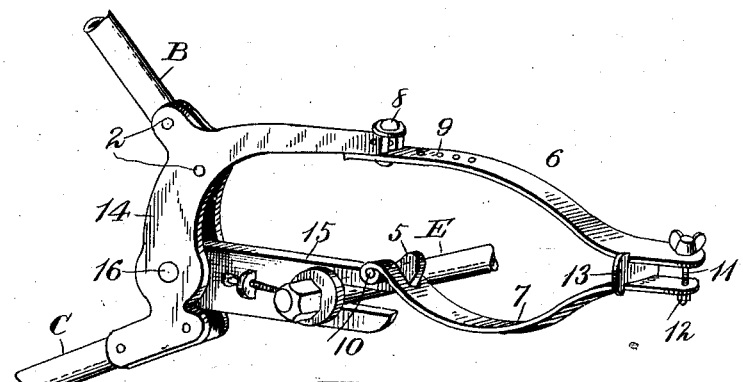
WITNESSES:
F. L. Ourand.
J. P. Campbell.
INVENTOR
Raymond Huber
BY Louis Bagger & Co.
his Attorneys

UNITED STATES PATENT OFFICE.

RAYMOND HUBER, OF NORTH PLAINFIELD, NEW JERSEY, ASSIGNOR OF ONE-HALF TO RICHARD MOLDENKE, OF WATCHUNG, NEW JERSEY.

SHOCK-ABSORBER.

No. 908,993.      Specification of Letters Patent.      Patented Jan. 5, 1909.

Application filed January 24, 1908. Serial No. 412,518.

*To all whom it may concern:*

Be it known that I, RAYMOND HUBER, citizen of the United States, residing at North Plainfield, in the county of Somerset and State of New Jersey, have invented certain new and useful Improvements in Shock-Absorbers, of which the following is a specification.

My invention relates to an improvement in a shock absorber for bicycles, motorcycles, or the like.

It has for its object the provision of means for absorbing all jar while riding over rough streets or roads.

It has for its further object means for adjusting the tension of the absorber.

Figure 1:
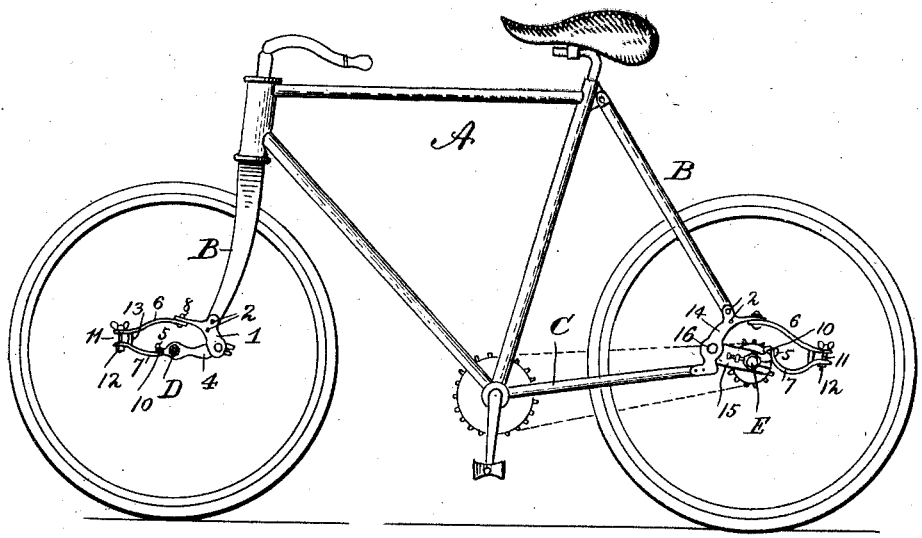
Figure 4:
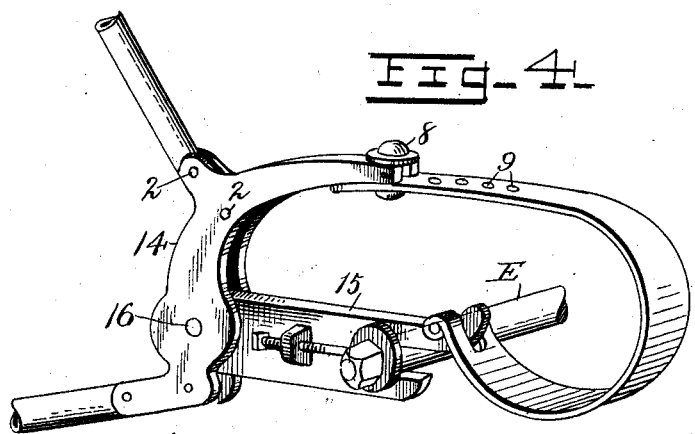

In the drawings:—Figure 1 is a view of a bicycle with the absorber attached; Fig. 2 is a detail view of the absorber on the front forks; Fig. 3 is a detail view of the absorber on the rear forks, and Fig. 4 is a view of a slight modification.

A, represents the bicycle frame having the forks B, B, and U-shaped arm C.

D represents the front axle and E the rear axle. Rigidly secured to the front forks are the links 1 consisting of two metal plates fastened to the forks by means of the pins 2. Pivoted to the links 1 at 3 are links 4, which have an opening to receive the axle D. These links 4 also have the extensions 5, the purpose of which will hereinafter be described.

6 and 7 represent metal bands, which are secured to the links 1 and 4 and form a spring between the same. The band 6 is secured to the links 1 by means of bolts 8 adapted to enter perforations 9 in the band. The spring 7 is slotted at one end and is adapted to fit around the extension 5 on the link 4. The ends are bent as shown and the band held in position on the link by means of a pin 10. The front end of the metal bands are held together by means of a thumb screw 11 and nut 12 and have a spacing block 13 therebetween.

The construction on the rear axle is slightly different as the link 14 is rigidly secured to both the rear forks and the U-shaped arm C. A link 15 is pivoted to the link 14 at 16 and is slotted at the end so as to receive the axle E. In all other particulars the construction is the same as on the front axle.

It is believed that the operation of this absorber can readily be understood from the foregoing description. The parts being assembled cannot very easily get out of shape, and should the tension of the spring become inadequate to absorb all the shock, the same can be put under greater or less tension by simply turning the thumb screw 11. If this is not enough the arm 6 can be so adjusted to have the bolt 8 pass through any one of the perforations 9.

As shown in the modification, Fig. 4 instead of having the spring made in two pieces I may make it in only one piece and adjust the same by means of the bolt 8 and the perforations 9.

It is evident that slight changes might be resorted to in the form and arrangement of the several parts described without departing from the spirit and scope of my invention, and hence I do not wish to be limited to the exact construction herein set forth, but:—

Having fully described my invention, what I claim as new and desire to secure by Letters Patent is:—

1. In a shock absorber for bicycles the combination with a frame, of a link connected therewith, adapted to form a bearing for the axle, a spring connected at one end to the frame and at the opposite end to the link, and means for connecting the spring at different points throughout its length to the frame whereby to adjust the tension of the spring.

2. A shock absorber for bicycles consisting of two links pivoted together at one end, one of which is attached to the fork and the other forming a bearing for the axle, a two-piece spring connecting the opposite ends of the links, a bolt for adjusting the tension of the spring and a spacing block located at a point between the bolt and the pivoted links.

3. A shock absorber for bicycles consisting of two links pivoted together, one of which is attached to the fork and the other forming a bearing for the axle, a two piece spring connecting the opposite ends of the links, one piece of said spring being provided with perforations for adjustably securing it to the link on the fork and the other having a slot adapted to engage the other link and looped ends for receiving a pin for locking the spring in position.

4. A shock absorber for bicycles consisting of two links pivoted together at one end and connected at the opposite end by means of a two-piece spring, the forward ends of the spring being spaced by means of a block, and means for adjusting the tension of the spring.

5. A shock absorber for bicycles consisting of two links pivoted together; one of which is attached to the fork and the other forming a bearing for the axle, and a spring provided with a plurality of perforations connecting the ends of the links opposite their pivot, and means for adjusting the tension of the spring consisting of a bolt attached to one of said links and adapted to register with any one of said perforations.

In testimony whereof I affix my signature in presence of two witnesses.

RAYMOND HUBER.

Witnesses:
FREDERICK A. MARTIN,
L. W. HAMMOND.